SO-CALLED C₁₄-ALDEHYDE

SO-CALLED C₁₇-ACID

SO-CALLED C₁₈-KETONE

VITAMIN A

ISOIONYLIDENE ACETIC ACID

β-IONOL ACETIC ACID ETHYL-ESTER

INVENTORS
HENDERIKUS O. HUISMAN
ANNE SMIT

United States Patent Office 3,056,834
Patented Oct. 2, 1962

3,056,834
SYNTHESIS OF VITAMIN A
Henderikus Obias Huisman, Amsterdam, and Anne Smit, Weesp, Netherlands, assignors to North American Philips Company, Inc., New York, N.Y., a corporation of Delaware
Filed July 29, 1959, Ser. No. 830,341
Claims priority, application Netherlands Jan. 22, 1953
9 Claims. (Cl. 260—544)

This application is a continuation-in-part of our copending application Serial No. 396,527 filed December 7, 1953, and now abandoned.

A number of methods have been proposed for the synthesis of vitamin A.

Figure 1:
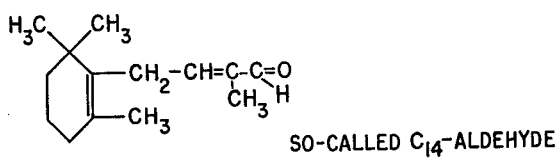
Figure 2:
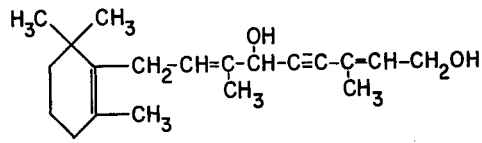
Figure 3:
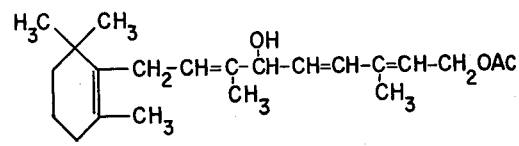

Thus, a method has been described according to which the synthesis of vitamin A is carried out through the following successive intermediate products; beta-ionone, the so-called $C_{14}$-aldehyde (illustrated in FIG. 1), a compound illustrated by FIG. 2, the partial hydrogenation product of the mono-acetate of the last-mentioned compound (illustrated in FIG. 3) and the product obtained after allylic re-arrangement and dehydration from the compound illustrated in FIG. 3.

Figure 4:
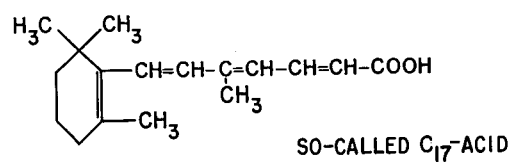
Figure 5:
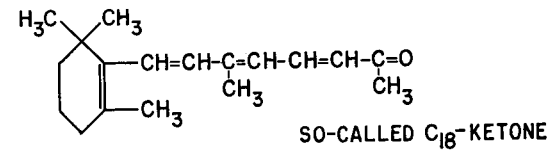

An alternative synthesis is carried out via beta-ionone, the so-called $C_{17}$-acid (illustrated in FIG. 4), the so-called $C_{18}$-ketone (for the formula see FIG. 5) and vitamin A acid.

According to a further alternative method beta-ionylidene acetic acid ethyl ester obtained by condensation of beta-ionone with monohalogen acetic acid ester according to the method of the principle of which has been described by Reformatzky after dehydration, is reduced with the use of lithium aluminium hydride to form beta-ionylidene ethanol, this alcohol is subsequently oxidized with the use of manganese dioxide to form beta-ionylidene acetaldehyde, this aldehyde is condensed with the use of acetone to form the so-called $C_{18}$-ketone, this ketone thereupon is subjected to a Reformatzky reaction with a monohalogen acetic acid ester which followed by dehydration, results in an ester of vitamin A acid being obtained, whereupon finally the acid produced therefrom after saponification is reduced with the use of lithium aluminum-hydride to form vitamin A.

The yield of vitamin A prepared by these latter two methods has been very low. The reason for this low yield is due to the formation of a very large amount of retro or iso esters when hydroxy acid esters, in which the hydroxy group is in allylic position with respect to a carbon to carbon double bond, is dehydrated. The formation of only a very small amount of the "normal" esters is due to an allylic re-arrangement during the dehydration reaction.

Figure 6:
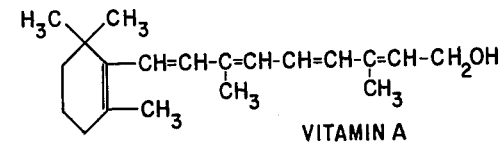
Figure 7:
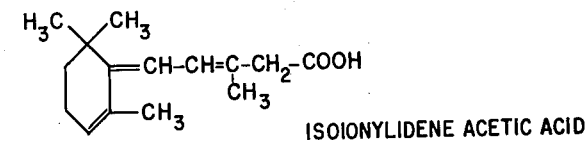

In this connection the term "retro" or "iso" compound is to be understood to mean compounds of the vitamin A-series which are similar as far as the structure of the carbon skeleton is concerned but are different as far as the arrangement of the double bonds is concerned. (A "retro" or an "iso" ester is illustrated in FIG. 7.) The term "normal" compounds is to be understood to mean compounds which can be represented by a structural formula in which the arrangement of the system of conjugated double bonds is the same as that in vitamin A (vitamin A is illustrated in FIG. 6). The term "compounds" as used in this paragraph may include acids, esters, acid halides and alcohols.

In U.S. patent application Ser. No. 396,525, now abandoned, filed December 7, 1953 by Huisman et al. (PH. 12,047) a method has been described of producing acid halides from the vitamin A-series which is characterized by the action of halogenating agents upon a compound selected from the group which consists of substances which can be represented by the following formulae:

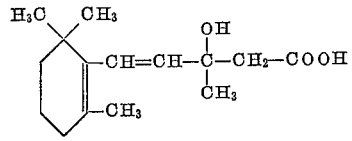

and

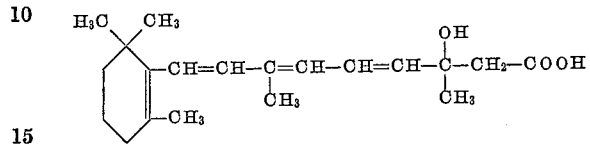

to obtain acid halides of the general formula:

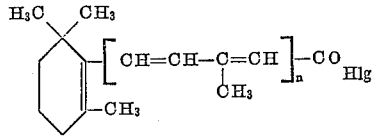

where $n=1$ or 2 and Hlg represents a halogen atom.

This method allows solely or substantially solely "normal" acid halides to be produced from the said hydroxy-acids with simultaneous dehydration.

In copending U.S. patent application Ser. No. 396,526, filed December 7, 1953 by Huisman et al. (PH. 12,048) a method is described of producing alcohols from the vitamin A-series of the general formula:

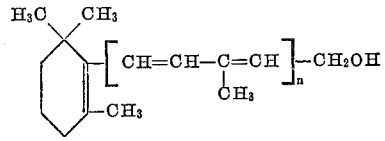

where $n=1$ or 2, characterized in that acid halides of the general formula:

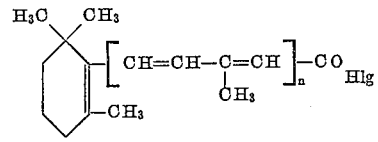

are used as starting material and are converted into the corresponding primary alcohols.

The last-mentioned method permits primary alcohols of the vitamin A-series, more particularly vitamin A, to be produced which contain very small proportions of iso-isomers.

The present invention relates to a definite combination of methods of producing a vitamin A, according to which vitamin A can be synthesized in comparatively pure form and with an unexpectedly high yield. Thus, it has been found—as will be set out more fully with reference to examples—that the method of the invention allows vitamin A to be produced in a purity of 60% from beta-ionone without employing purification methods, a yield of vitamin A being obtained of 36%, calculated on beta-ionone as starting material.

According to the invention a method of producing vitamin A employing a special combination of methods is characterized in that the combination comprises the following successive steps: condensation of beta-ionone with monohalogen acetic acid ester according to the method of Reformatzky, conversion of the dehydration product of the hydroxy ester thus obtained, after saponification, into the acid halide of beta-ionylidene acetic acid, conversion of the acid halide into the corresponding alcohol, conversion of beta-ionylidene ethanol into the socalled $C_{18}$-ketone, condensation of the $C_{18}$-ketone with monohalogen acetic acid ester according to the Reformatzky method with subsequent conversion of the dehydration hydroxy product of the hydroxy ester thus obtained, after saponification, into vitamin A acid halide with subsequent conversion of the acid halide into the corresponding alcohol.

The dehydration of the hydroxy esters obtained in the Reformatzky reaction may take place by boiling a solution of the hydroxy-esters in a hydrocarbon solvent, for example petroleum ether, or benzene, which contains catalytic amounts of iodine.

In establishing the invention, phosphorus trichloride, was found to be particularly suitable for the halogenation of the acids obtained after saponification of the esters or hydroxy esters. In the use of the said phosphorus trichloride it is important to note that complete conversion of 1 mol iso-acid into an alpha-beta unsaturated acid halide requires at least ⅓ mol phosphorus trichloride.

Preferably the chlorination is carried out in a solvent which does not react with the reaction components, for example benzene, toluene, xylene. In these solvents the reaction is preferably carried out at a temperature of from 50° C. to 70° C.

In addition, it has been found that chloroform is particularly suitable as a solvent. In this event the halogenation is preferably carried out at a temperature of from approximately —50° C. to 0° C.

In order to convert the said acid halides into corresponding alcohols the first-mentioned compounds may be hydrolized to form the corresponding acids and these may be subsequently reduced or the esters produced from the acid halides may be reduced to form the corresponding primary alcohols.

In one embodiment of the invention the acid halide is reduced to form a primary alcohol.

As reducing agents only those substances are suitable which cause little or no reduction of double bonds. As examples of such substances there may be employed metal hydraides containing two different metal atoms, for example lithium aluminum hydride, sodium boron hydride and magnesium aluminum hydride.

In order to convert beta-ionylidene ethanol into the so-called $C_{18}$-ketone, it is possible, for example, to treat the first mentioned compound with acetone under oxidizing conditions, for example, in the presence of tertiary aluminum isopropylate. In a preferred embodiment of the invention beta-ionylidene ethanol is oxidized with the use of manganese dioxide to form beta-ionylidene acetaldehyde and this compound converted into the so-called $C_{18}$-ketone with acetone under alkaline conditions, for example, under the action of dilute solution of caustic soda.

More particularly the method of the invention consists of a combination of a number of known and unknown steps which are applied to substances known per se. Of the known steps we may mention the condensation of beta-ionone or the so-called $C_{18}$-ketone with monohalogen acetic acid ester according to the Reformatzky method, the conversion of beta-ionylidene ethanol into the so-called $C_{18}$-ketone and also in general the production of acid halides from the corresponding acids. The formation of "normal" acid-halides of the vitamin A series from acids belonging to the series of "iso"-compounds has not been described before. Prior to establishing the invention it has been found that the Reformatzky reaction, if it is combined with dehydration, leads to the formation of a mixture of isomers chiefly containing the undesired isomers belonging to the iso-ionylidene series which adversely affects the yield of vitamin A in the further synthesis of this substance. Quite surprisingly it was found in establishing the invention that from the mixture of isomers produced always by dehydrating the reaction products of the Reformatzky reaction, acid halides are obtained comprising a "normal" system of conjugated double bonds and being wholly or substantially wholly free from "iso" acid halides. According to a further feature of the invention these acid halides are converted almost entirely into the corresponding "normal" alcohols.

Thus, the invention permits the production of vitamin A containing no or substantially no iso-vitamin A, despite the fact that in two phases of the method steps are used which chiefly lead to the formation of the hitherto undesired "iso"-compounds.

The invention will now be explained with reference to the following examples.

EXAMPLE I

*Production of Beta-Ionylidene Ethanol From Beta-Ionone Via "Iso"-Ionylidene Acetic Acid*

Figure 8:
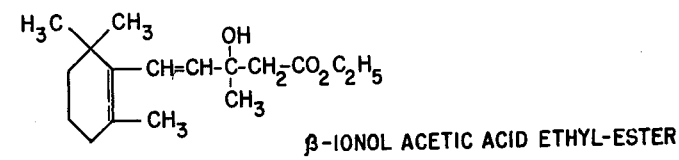

In the manner described by Huisman in Recueil des Travaux Chimiques des Pays-Bas, 71, 915 (1952) beta-ionol acetic acid ethyl ester (for the formula see FIG. 8) was produced according to the Reformatzky method from 96 g. purified beta-ionone and 84 g. of the ethyl ester of bromo-acetic acid. The output was 133 g., that is 95% of the theoretically possible output calculated on beta-ionone. The substance was dissolved in 500 cc. anhydrous benzene to which solution 100 mgs. iodine was added. After standing overnight at room temperature the solution was washed with sodium thiosulphate solution and after drying in vacuo concentrated by evaporation. The oily residue (122 g.) consisted of "iso" $C_{15}$ acid ethyl ester (for the formula of the acid see FIG. 7). The U.V. absorption spectrum of an ethanolic solution of the "iso" compound exhibited one maximum at 2840 A. ($\epsilon = 26,200$) and inflections at approximately 2700 A. ($\epsilon = 22,500$) and 2900 A. ($\epsilon = 23,600$). The ester was saponified in an alcoholic solution of caustic soda to form "iso"-$C_{15}$-acid (output 98 g.) and this acid after having been dissolved in 300 cc. benzene converted into 106 gms. beta-ionylidene acetic acid chloride with the use of a mixture of 20 g. phosphorus trichloride and 25 cc. benzene. The ethereal solution of the acid chloride was directly reduced with the use of an ethereal solution of 12 g. LiAlH$_4$. From the reaction product 91 g. beta-ionylidene ethanol was obtained; that is 83% of the theoretically possible output calculated on beta-ionone. The U.V. absorption spectrum of this compound exhibited maxima at 2650 A. ($\epsilon = 12,600$) and 2400 A. ($\epsilon = 12,400$.)

EXAMPLE II

*Production of Beta-Ionylidene Acetaldehyde*

To a solution of 91 g. of beta-ionylidene ethanol as produced according to the preceding example in petroleum ether a large excess of manganese dioxide was added. This mixture was refluxed for approximately 2 hours. After separation of the manganese dioxide and distillation of petroleum ether in vacuo 86 g. beta-ionylidene acetaldehyde was obtained, that is 79% of the theoretically possible output calculated on beta-ionone. The U.V. absorption spectrum of a solution of the substance in cyclohexane exhibited maxima at the wavelengths 2670 A. ($\epsilon = 12,200$) and 3100 A. ($\epsilon = 14,600$) and a minimum at 2330 A. ($\epsilon = 5,100$).

EXAMPLE III

*Production of $C_{18}$-Ketone*

The beta-ionylidene acetaldehyde obtained in Example II was mixed with 90 cc. acetone and 90 cc. 1 N solution of caustic soda and thereupon shaken for 70 hours at room temperature. After working up the reaction mixture 97 g. so-called $C_{18}$-ketone was obtained. The U.V. absorption spectrum of a solution of this substance in 96% ethanol exhibited a maximum at $$3450 \text{ A. } (E_{1\,cm.}^{1\%} = 910)$$

and a minimum at $$2470 \text{ A. } (E_{1\,cm.}^{1\%} = 166)$$

EXAMPLE IV

*Production of Vitamin A Acid Halide From $C_{18}$-Ketone*

A solution of 97 g. so-called $C_{18}$-ketone and 70 g. of the ethyl ester of bromo-acetic acid in 600 ccs. anhydrous benzene was converted with the use of 40 g. of activated zinc according to the Reformatzky reaction into so-called hydroxy $C_{20}$ acid ethyl ester. After working up the reaction mixture 127 g. of the last-mentioned compound was obtained. The U.V. absorption spectrum of an ethanolic solution of the substance exhibited a maximum at 2900 A. ($E_{1\,cm.}^{1\%}=723$)

The hydroxy $C_{20}$ acid ethyl ester thus obtained was converted into "iso" $C_{20}$ acid ethyl ester by treating a solution of the substance in benzene with iodine. 118 g. "iso" ester was obtained, that is 72% of the theoretically possible output calculated on beta-ionone.

The U.V. absorption spectrum exhibited the following characteristic maxima $\lambda_{max.}=3490$ A. ($E_{1\,cm.}^{1\%}=1310$)

$\lambda_{max.}=3660$ A. ($E_{1\,cm.}^{1\%}=1095$)

$\lambda_{max.}=3350$ A. ($E_{1\,cm.}^{1\%}=1020$)

The "iso" ester was subsequently saponified with the use of alcoholic solution of caustic soda, 97.5 g. "iso" acid being obtained.

The U.V. absorption spectrum exhibited 3 maxima at 3500 A. ($E_{1\,cm.}^{1\%}=1290$), 3350 A. ($E_{1\,cm.}^{1\%}=1040$) and 3670 A.

($E_{1\,cm.}^{1\%}=985$)

After dissolving the "iso" acid in 300 cc. benzene it was converted into vitamin A acid chloride with the use of a mixture of 15 g. $PCl_3$ dissolved in 15 cc. benzene. 104 g. vitamin A acid chloride was obtained.

EXAMPLE V

*Production of Vitamin A*

The vitamin A acid chloride obtained according to the preceding example was dissolved in ether and reduced with the use of an ethereal solution of 10 g. lithium aluminum hydride at approximately $-20°$ C.-$0°$ C. From the reaction mixture 88 g. crude vitamin A was separated. The biopotency of this product was found to be at least 1,980,000 I.U. per gram, indicating a concentration of 59.5% of vitamin A. The yield of vitamin A is consequently $0.595 \times 88$ g.=52 g., that is 36% of the theoretically possible output calculated on beta-ionone.

For the purposes of comparison the following examples illustrate the yield of vitamin A produced by a method of the prior art.

EXAMPLE VI

A mixture of 96 g. of beta-ionone, 96 g. of monobromoacetic acid ethyl ester, 37.6 g. of zinc dust and 250 mls. of benzene were refluxed after addition of an iodine crystal. A violent reaction set in after some time. When the reaction diminished the mixture was refluxed for half an hour, cooled, shaken with excess 5% hydrochloric acid; the benzene layer was washed successively with water and dilute sodium bicarbonate solution. After drying over sodium sulphate the benzene was evaporated. The so obtained crude hydroxy-ester showed an absorption maximum in the U.V. at 234 m$\mu$.

$E_{1\,cm.}^{1\%}=198$

The substance could be purified by distillation in high vacuum to obtain a pale yellowish oil. The yield of pure product was 98% calculated on beta-ionone.

EXAMPLE VII 14.8 g. of this hydroxyester was dissolved in benzene (65 mls.), a small crystal of iodine was added and the mixture was refluxed for half an hour. After cooling, the solution was washed successively with dilute sodium thiosulphate solution and water, dried and the solvent evaporated. The crude ester obtained in this way had an absorption maximum at 284 m$\mu$ in the U.V.

$E_{1\,cm.}^{1\%}=940$

This crude ester could be separated by chromatography on aluminum oxide into two compounds:

(a) iso-ionylidene acetic acid ester $\lambda_{max}=284$ m$\mu$ $E_{1\,cm.}^{1\%}=1260$ (b) beta-ionylidene acetic acid ester $\lambda_{max}=256$ m$\mu$ and 304 m$\mu$.

$E_{1\,cm.}^{1\%}=461$ and 570 respectively

In this way the beta-ionylidene acetic acid ester was obtained in a practically pure state. The yield of pure product was 51% calculated on the hydroxyester.

EXAMPLE VIII 4.6 g. of this beta-ionylidene acetic acid ester was dissolved in 60 mls. of dry ether, and a solution of 0.76 g. of lithium aluminum hydride in 50 mls. of dry ether was added in a period of 2 min. After stirring 5 additional minutes, 100 mls. of 5% hydrochloric acid was added, and the ether layer washed with water, dried over sodium sulphate, and evaporated, to obtain 3.85 g. of substantially pure beta-ionylidene ethanol. $\lambda_{max}$ 240 and 265 m$\mu$, $E_{1\,cm.}^{1\%}$ resp. 550 and 590

The yield of beta-ionylidene ethanol calculated on beta-ionylidene acetic acid ester was 99%.

EXAMPLE IX 3.0 g. of beta-ionylidene ethanol, 6.0 g. of aluminum isopropoxide; 40 mls. of acetone and 60 mls. of benzene were refluxed for 20 hours. After cooling the mixture was poured into 150 mls. of 5% hydrochloric acid, washed with 5% hydrochloric acid, sodium bicarbonate solution, and water. The solvent was evaporated, to obtain 3.55 g. of crude $C_{18}$-ketone. $\lambda_{max}=345$ m$\mu$ $E_{1\,cm.}^{1\%}=675$ This crude ketone could be purified by chromatography. A pure $C_{18}$-ketone $E_{1\,cm.}^{1\%}$ (at $\lambda_{max.}=345$) is 1050 was obtained in a yield of 69% calculated on beta-ionylidene ethanol.

EXAMPLE X 3.1 g. of $C_{18}$-ketone, 2.5 g. of ethyl bromoacetate, 1.0 g. of zinc dust and 15 mls. of benzene were refluxed after addition of a crystal of iodine. A violent reaction set in. The mixture was refluxed for an additional 30 minutes, cooled, shaken with dilute hydrochloric acid, washed with water, sodium bicarbonate solution and water and dried over sodium sulphate. This solution was diluted with benzene and refluxed after addition of a small crystal of iodine for half an hour. After cooling the solution was washed with sodium thiosulphate solution and water and dried on sodium sulphate. The solvent was evaporated in vacuo to obtain a mixture of esters. The U.V. abs. spectrum showed three maxima at 335 m$\mu$, 350 m$\mu$ and 370 m$\mu$.

$E_{1\,cm.}^{1\%}$ respectively 960, 1650 and 1120

This mixture of esters could be separated by chromatography. There were obtained two fractions (a) iso-vitamin-A-acid ester with three maxima at 335 m$\mu$, 350 m$\mu$ at 365 m$\mu$.

$E_{1\,cm.}^{1\%}$ respectively 1440, 2160 and 1790

(b) vitamin-A-acid ester with one maximum at 350 mμ

$$E_{1\,cm.}^{1\%} = 1330$$

The yield of vitamin-A-acid ester calculated on $C_{18}$-ketone was 42%.

EXAMPLE XI 0.75 g. of vitamin-A-acid ester was reduced with 50 mgs. of lithium aluminum hydride in 20 mls. of ether at −25° C. The mixture was worked up by addition of water and extraction with ether. After drying over sodium sulphate the solvent was evaporated in vacuo to obtain 0.65 g. of vitamin-A. The crude product had one maximum at 326 mμ

$$E_{1\,cm.}^{1\%} = 1370$$

The yield of vitamin-A calculated on vitamin-A-acid ester was 95%. The overall-yield of vitamin A calculated on beta-ionone was found to be:

$$0.98 \times 0.51 \times 0.99 \times 0.69 \times 0.42 \times 95\% = 13.8\%$$

While we have described our invention in connection with specific embodiments and applications, other modifications thereof will be readily apparent to those skilled in this art without departing from the spirit and scope of the invention as defined in the appended claims.

What we claim is:

1. A method of producing a member of the group consisting of β-ionylidene acid chloride and vitamin A acid chloride which method comprises subjecting a mixture of acids selected from the group consisting of a major amount of iso-ionylidene acetic acid and a minor amount of β-ionylidene acetic acid and a mixture of a major amount of iso-vitamin A acid and a minor amount of vitamin A acid to the action of phosphorus trichloride.

2. A method of producing a member of the group consisting of beta-ionylidene ethanol and vitamin A which method comprises subjecting a mixture of acids selected from the group consisting of a mixture of a major amount of iso-ionylidene acetic acid and a minor amount of beta-ionylidene acetic acid and a mixture of a major amount of iso-vitamin A acid and a minor amount of vitamin A acid to the action of phosphorus trichloride, to thereby form an acid chloride selected from the group consisting of beta-ionylidene acetic acid chloride and vitamin A acid chloride and reducing said acid chloride with a double metal hydride reducing agent selected from the group consisting of lithium aluminum hydride, sodium boron hydride and magnesium aluminum hydride to form thereby a member of the group consisting of beta-ionylidene ethanol and vitamin A.

3. The method of claim 2 in which the chlorination reactions are carried out in an inert aromatic hydrocarbon solvent at a temperature of from 50° C.–70° C.

4. The method of claim 2 in which the reactions with the chlorinating agent are carried out in chloroform at a temperature of from −50° C.–0° C.

5. The method of claim 2 in which the reduction reaction is carried out at a temperature below 5° C.

6. A method of producing a member of the group consisting of β-ionylidene ethanol and vitamin A which method comprises subjecting a mixture of acids selected from the group consisting of a mixture of a major amount of iso-ionylidene acetic acid and a minor amount of β-ionylidene acetic acid and a mixture of a major amount of iso-vitamin A acid and a minor amount of vitamin A acid to the action of phosphorus trichloride, to thereby form an acid chloride selected from the group consisting of β-ionylidene acetic acid chloride and vitamin A acid chloride, esterifying said acid chloride and reducing the resultant ester with a double metal hydride reducing agent selected from the group consisting of lithium aluminum hydride, sodium boron hydride and magnesium aluminum hydride to form thereby a member of the group consisting of β-ionylidene ethanol and vitamin A.

7. The method of claim 6 in which the acid chloride of the beta-ionylidene acetic acid is esterified to form an ester of beta-ionylidene acetic acid before reduction.

8. The method of claim 6 in which the vitamin A acid chloride is esterified to form an ester of vitamin A acid before reduction.

9. A method of producing a member of the group consisting of β-ionylidene ethanol and vitamin A which method comprises subjecting a mixture of acids selected from the group consisting of a mixture of a major amount of iso-ionylidene acetic acid and a minor amount of β-ionylidene acetic acid and a mixture of a major amount of iso-vitamin A acid and a minor amount of vitamin A acid to the action of phosphorus trichloride, to thereby form an acid chloride selected from the group consisting of β-ionylidene acetic acid chloride and vitamin A acid chloride, hydrolyzing said acid chloride to the acid and reducing said acid with a double metal hydride reducing agent selected from the group consisting of lithium aluminum hydride, sodium boron hydride and magnesium aluminum hydride to form thereby a member of the group consisting of β-ionylidene ethanol and vitamin A.

References Cited in the file of this patent

UNITED STATES PATENTS

| | | |
|---|---|---|
| 2,475,966 | Hull | July 12, 1949 |
| 2,680,755 | Robeson et al. | June 8, 1954 |

OTHER REFERENCES

Heilbron et al.: (A), Jour. Chem. Soc. (1946), 866–869, 260—617(A) (4 pp.).

Nystrom et al.: Jour. Amer. Chem. Soc., Vol. 69 (1947) 260—617(A), 1197–99 (3 pp.).

Heilbron et al.: (B), Jour. Chem. Soc. (1948), 386–393, 260—617(A) (8 pp.)

Wendler et al.: Jour. Amer. Chem. Soc., Vol. 73 (1951), 260—617(A), 719–24 (6 pp.).

(Copies of above in Pat. Off. Library.)